United States Patent [19]

Loretti et al.

[11] Patent Number: 4,917,925
[45] Date of Patent: Apr. 17, 1990

[54] MULTILAYER SHEET MATERIAL, PROCESS FOR ITS MANUFACTURE AND ITS USE

[75] Inventors: Maurice Loretti, Chatelaine/Geneva; Pierre Vanat, Geneva, both of Switzerland

[73] Assignee: Vifor S.A., Carouge, Switzerland

[21] Appl. No.: 385,708

[22] Filed: Jul. 26, 1989

[30] Foreign Application Priority Data

Jul. 29, 1988 [CH] Switzerland .......................... 2898/88

[51] Int. Cl.⁴ ...................... B32B 23/08; B32B 27/08; B32B 27/34
[52] U.S. Cl. ................. 428/35.7; 428/476.3; 428/476.9; 428/516; 156/244.13
[58] Field of Search ................. 428/35.7, 476.3, 476.9, 428/516; 156/244.13

[56] References Cited

U.S. PATENT DOCUMENTS

| | | | |
|---|---|---|---|
| 3,686,069 | 8/1972 | Winkler | 161/227 |
| 4,233,367 | 11/1980 | Ticknor et al. | 428/476.3 |
| 4,322,480 | 3/1982 | Tuller et al. | 428/476.1 |

Primary Examiner—Marion C. McCamish
Assistant Examiner—Elizabeth M. Cole
Attorney, Agent, or Firm—Richard Bushnell

[57] ABSTRACT

A multilayer sheet material comprising an 11-aminoundecanoic acid polyamide film (1) bonded by at least one of its faces to a polypropylene film (2) is obtained by coextrusion of the corresponding polyamide and polypropylene. It can be used for the manufacture of impermeable flexible bags for sterile solutions.

10 Claims, 1 Drawing Sheet

MULTILAYER SHEET MATERIAL, PROCESS FOR ITS MANUFACTURE AND ITS USE

BACKGROUND OF THE INVENTION

Impermeable flexible bags are used abundantly in the pharmaceutical industry and more particularly in the field of solutions for perfusions. Such bags are made on the basis of polymerized materials satisfying a very wide variety of conditions: impermeability to gases and vapors, transparency, inertness towards the substances they contain, i.e. essentially aqueous solutions of salts, carbohydrates, amino acids or other substances, heat stability so that they can withstand hot sterilization, weldability, and so on. The material most widely used in this field is polyvinyl chloride (PVC), which satisfies the most important of the conditions mentioned above; however PVC is a source of pollution because it releases chlorinated substances on combustion, which is no longer permissible. Furthermore, the stability of PVC is not absolute, especially towards certain solutions.

For reasons primarily concerning protection of the environment, industry is therefore faced with the need to find materials to replace PVC, preferably simple or composite polymerized materials combining all the qualities inherent in PVC, without at the same time being a source of pollution. The object of the invention is precisely to propose a novel polymerized material which makes it possible advantageously to solve the problem presented by the replacement of PVC, especially in the field of impermeable flexible bags for sterile solutions.

It is in fact very rare to find a simple polymerized material (homopolymer or copolymer) which by itself possesses all the requisite characteristics and which is commercially attractive as well. Research has therefore been directed towards the production of composite, so-called multilayer materials in which one endeavors to combine the intrinsic properties of each constituent in order to achieve the desired result. This is not an easy task because there are a number of conditions to satisfy (weldability, stability, flexibility, impermeability, etc.); furthermore, said constituents must be mutually compatible. The multilayer material as defined in claim 1 satisfies all these conditions.

THE INVENTION

The invention relates to a novel multilayer sheet material based on 11-aminoundecanoic acid polyamide and polypropylene, and more particularly to a material comprising a film of said polyamide bonded by at least one of its faces to a polypropylene film.

The invention further relates to a process for the manufacture of said material by the coextrusion of 11-aminoundecanoic acid polyamide and polypropylene, and to the use of such a material for the manufacture of impermeable flexible bags for sterile solutions.

BRIEF DESCRIPTION OF THE DRAWINGS

The drawing attached illustrates the present invention without implying a limitation. More particularly.

PREFERRED EMBODIMENTS OF THE INVENTION

The invention consists of a novel polymerized material, of multilayer structure, comprising an 11-aminoundecanoic acid polyamide film 1 bonded by at least one of its faces to a polypropylene film 2. In one particular embodiment, the material according to the invention will consequently comprise a polyamide film 1 bonded by each of its faces to a polypropylene film 2,2'.

Figure 1:
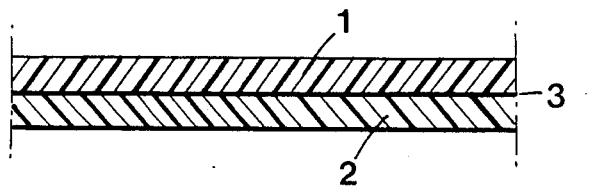
FIG. 1 shows a sectional view of a first embodiment of the material according to the invention.

In a preferred embodiment, the invention takes the form of a material composed of an 11-aminoundecanoic acid polyamide film 1 bonded by one of its faces to a polypropylene film 2, as illustrated in FIG. 1.

Figure 2:
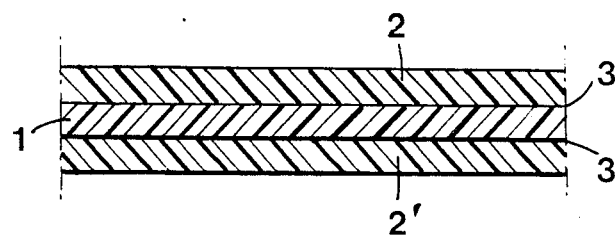
FIG. 2 shows a sectional view of a second embodiment of the material according to the invention.

In a variant of this preferred embodiment, said material is composed of a polyamide film 1 bonded by each of its faces to a polypropylene film 2,2', as illustrated in FIG. 2.

In each of the embodiments of the invention, in particular those mentioned above, the polyamide film 1 or polypropylene film 2 is a single film or a double film.

It is also possible to envisage, in an embodiment which has not been shown, a material which is analogous to that illustrated in FIG. 2 but in which one of the polypropylene films 2,2' is replaced with a film of another polyolefin, for example polyethylene.

As indicated above, the films 1 and 2 and, if appropriate, 2' are bonded to one another so as to form a coherent, mechanically inseparable whole. The bonding means used for such purposes consists of a polyolefin film 3 placed between the films 1 and 2 during the manufacturing process, which will be described below. The use of polyolefin creates particularly stable chemical interactions with the polymerized material of the films 1 and 2, without at the same time detracting from the properties of either of these films.

11-Aminoundecanoic acid polyamide (PA 11 in technical language) is a known and commercially available material which is remarkably impermeable to gases such as $O_2$, $N_2$ and $CO_2$. Moreover, it is a material which can readily be extruded and which proves extremely stable in use, unlike other polyamides such as caprolactam polyamide (PA 6), which releases a relatively large proportion of its monomer, caprolactam, over time and therefore proves unsuitable for a large number of uses.

In addition, PA 11 proves distinctly more inert to water than PA 6, which is why its mechanical properties (for example stress-cracking resistance) are very markedly superior under identical conditions. PA 11 has a melting range of between 178° and 194° C. and withstands the customary sterilization temperatures, i.e. 110° C. or above, without any problem.

Polypropylene (PP in technical language), which forms the film 2,2', is a known material of value in numerous fields. According to the invention, it is equally possible to use a homopolypropylene (melting point of the order of 158° C.) or a copolymer of propylene and ethylene, for example a propylene copolymer containing about 2% of ethylene (melting point of the order of 152° C.). Varying the quality of the polypropylene in this way produces a material of higher or lower melting point which advantageously adapts to welding techniques. Polypropylene is also impermeable to water vapor and this property combines favorably with those of the polyamide PA 11.

The multilayer material according to the invention therefore combines a very large number of advantages when it is compared with analogous composite materials:

it can be obtained by coextrusion, a more advantageous manufacturing process than colamination;

it withstands sterilization with steam at about 118° C. perfectly well, whereas a PA 6/PP or PP/PA 6/PE composite undergoes substantial degradation at this temperature.

The PA 11/PP material compares favorably with polypropylene (PP) as far as welding techniques are concerned: the welding head of the chosen apparatus can be heated to a sufficient temperature to melt the PP film (m.p. about 158° C.) without at the same time modifying the PA 11 polyamide film (m.p. >178° C.), which thus behaves as a protective sheet.

As indicated previously, the material according to the invention is obtained by the coextrusion of polypropylene, the chosen polyolefinic bonding means and polyamide (PA 11), i.e. direct from the corresponding granules without first proceeding via the preparation of sheets. For this purpose, it is advantageous to apply the blowing or film/film tube techniques, which make it possible to produce single as well as double PA 11 or PP films.

Using these techniques, it is possible to obtain all the desired variants, only some of which are mentioned below by way of example (single films—FIG. 1):

| polyamide (PA 11) | bonding means | polypropylene (PP) |
| --- | --- | --- |
| 30 | 10 | 65 |
| 30 | 10 | 75 |
| 30 | 10 | 90 |
| 30 | 10 | 120 |
| 40 | 10 | 110 |
| 60 | 10 | 120 |

Other variants (double films):

| polyamide (PA 11) | bonding means | polypropylene (PP) |
| --- | --- | --- |
| 15/15 | 10 | 45/45 |
| 20/20 | 10 | 55/55 |

The use of PA 11 and/or PP double films makes it possible markedly to increase the mechanical strength of the films forming the multilayer material according to the invention. It will also be observed that, in view of the compatibility of the polymers involved, the production of PA 11/PA 11 and PP/PP double films does not necessitate the presence of bonding means. Of course, depending on the desired effects, the use of single and double films can be combined in such a material in order to give, for example, a material of the type PA 11/PA 11/PP or PA 11/PP/PP.

Other variants (single films—FIG. 2):

| polypropylene | bonding means | polyamide | binding means | polypropylene |
| --- | --- | --- | --- | --- |
| 30 | 10 | 25 | 10 | 50 |

As indicated earlier, this list is not exhaustive.

The above figures represent thicknesses in microns. Any variations in thickness are permitted, depending on the desired effects, the minimum values being fixed by the mechanical strength of the film in question. For the uses selected, the polyamide film (PA 11) preferably has a thickness of at least 20 microns.

Figure 3:
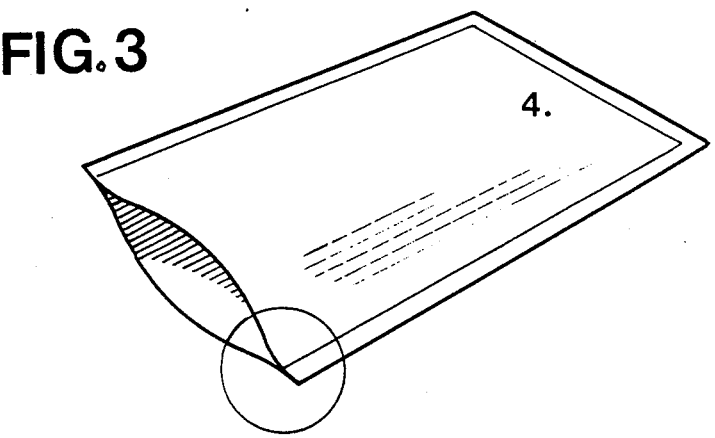
FIG. 3 shows one of the uses of the material according to the invention.

In its preferred variant, i.e. in the form of a binary material (FIG. 1), the material according to the invention proves very useful for the manufacture of impermeable flexible bags for sterile solutions, in particular of impermeable flexible bags for perfusions (FIG. 3).

In this use, the polyamide film 1 (PA 11) forms the outer layer of the whole and the polypropylene film 2 (PP) forms its inner layer. In such a composite (PA 11/PP in technical language), the polyamide film is protected from contact with the aqueous solution by the polypropylene film and the aqueous solution in question is effectively protected from gases such as $O_2/CO_2$ by the barrier formed by the polyamide film.

Figure 4:
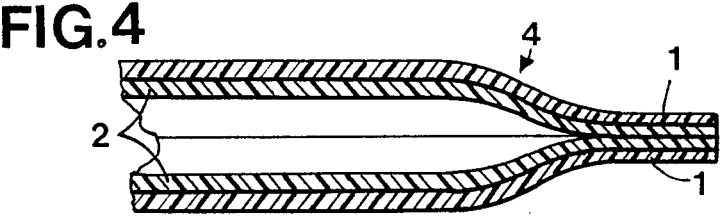
FIG. 4 shows a sectional view of a detail of FIG. 3.

As far as the manufacture of the actual flexible bag is concerned, two sheets of the material defined above are placed against one another and a weld is created between the two polypropylene films placed together in this way, with all the advantages mentioned above (see detail in FIG. 4).

The advantages of such a material, for the purpose set out above, are very numerous and it is also possible to mention the biocompatibility with solutions of carbohydrates, lipids or amino acids, the impermeability to water vapor (reduced water losses), the chemical stability during sterilization (small pH variations) and the easy adaptation to welding techniques, whether this be thermowelding or ultrasonic welding. Furthermore, the outer polyamide film is suited to printing techniques.

Consequently, the invention further relates to the use of the material described above for the manufacture of impermeable flexible bags for sterile solutions and to the flexible bags obtained from such a material.

Of course, other uses can be envisaged for this type of material, whether this be for the binary multi-layer variant (FIG. 1) or ternary multilayer variant (FIG. 2) or for any other variant of a greater degree of complexity.

What is claimed is:

1. A multilayer sheet material comprising an 11-aminoundecanoic acid polyamide film (1) bonded by at least one of its faces to a polypropylene film (2).

2. A multilayer material according to claim 1 in which a polypropylene film (2,2') is bonded to each of the faces of the 11-aminoundecanoic acid polyamide film (1).

3. A multilayer material according to claim 1 or claim 2, wherein the polypropylene film (2) is bonded to the polyamide film (1) by means of a polyolefin film (3).

4. A multilayer material according to any one of claims 1 to 3, wherein the polypropylene forming the film (2,2') is a propylene homopolymer.

5. A multilayer material according to any one of claims 1 to 3, wherein the polypropylene forming the film (2,2') is a copolymer of propylene and ethylene.

6. A multilayer material according to any one of claims 1 to 5, wherein the 11-aminoundecanoic acid polyamide film (1) or polypropylene film (2) is a single or double film.

7. A process for the manufacture of a multilayer sheet material according to any one of claims 1 to 6 by the co-extrusion of 11-aminoundecanoic acid polyamide and polypropylene.

8. Use of a multilayer sheet material according to any one of claims 1 to 6 for the manufacture of impermeable flexible bags for sterile solutions, in particular of impermeable flexible bags for perfusions.

9. Use according to claim 8, wherein said material is composed of a polyamide film (1) bonded by only one of its faces to a polypropylene film (2), the film (1) forming the outer layer and the film (2) forming the inner layer of said material.

10. An impermeable flexible bag for sterile solutions, in particular an impermeable flexible bag for perfusions, made of a multilayer material according to any one of claims 1 to 6.

* * * * *